US010702957B2

(12) United States Patent
Liu et al.

(10) Patent No.: US 10,702,957 B2
(45) Date of Patent: Jul. 7, 2020

(54) CUTTING SYSTEM

(71) Applicants: Tyco Electronics (Shanghai) Co. Ltd., Shanghai (CN); TE Connectivity Corporation, Berwyn, PA (US)

(72) Inventors: Yun Liu, Shanghai (CN); Liming Xin, Shanghai (CN); Lvhai Hu, Shanghai (CN); Dandan Zhang, Shanghai (CN); Roberto Francisco-Yi Lu, Berwyn, PA (US)

(73) Assignees: TE Connectivity Corporation, Berwyn, PA (US); Tyco Electronics (Shanghai) Co. Ltd., Shanghai (CN)

( * ) Notice: Subject to any disclaimer, the term of this patent is extended or adjusted under 35 U.S.C. 154(b) by 375 days.

(21) Appl. No.: 15/622,706

(22) Filed: Jun. 14, 2017

(65) Prior Publication Data

US 2017/0274483 A1 Sep. 28, 2017

Related U.S. Application Data

(63) Continuation of application No. PCT/IB2015/059732, filed on Dec. 17, 2015.

(30) Foreign Application Priority Data

Dec. 18, 2014 (CN) .............................. 201410791172

(51) Int. Cl.
*B23K 37/04* (2006.01)
*H01R 43/16* (2006.01)
(Continued)

(52) U.S. Cl.
CPC ...... *B23K 37/0435* (2013.01); *B23K 26/0884* (2013.01); *B23K 26/142* (2015.10);
(Continued)

(58) Field of Classification Search
CPC ............... B23K 37/0435; B23K 26/38; B23K 26/0884; B23K 26/142; B23K 2201/38
(Continued)

(56) References Cited

U.S. PATENT DOCUMENTS

| 4,382,728 A | * | 5/1983 | Anderson | ............... B23C 1/002 144/135.2 |
| 5,906,760 A | * | 5/1999 | Robb | ....................... B08B 15/00 219/121.67 |

(Continued)

FOREIGN PATENT DOCUMENTS

| DE | 3816692 A1 | 11/1989 |
| EP | 1148588 A2 | 10/2001 |

(Continued)

OTHER PUBLICATIONS

International Preliminary Report on Patentability and Written Opinion of the International Searching Authority, dated Jun. 20, 2017, 7 pages.

(Continued)

*Primary Examiner* — Thien S Tran
(74) *Attorney, Agent, or Firm* — Barley Snyder

(57) ABSTRACT

A cutting system is disclosed. The cutting system comprises a moving mechanism, a cutter mounted on the moving mechanism, a support table having a material plate disposed thereon, and a fixation device including a pressing plate having a row of teeth defining a row of teeth slots. The row of teeth press the material plate on the support table while the moving mechanism drives the cutter to move along edges of the row of teeth slots. The cutter cuts a plurality of workpieces out of the material plate by a single cutting process.

25 Claims, 3 Drawing Sheets

(51) Int. Cl.
*B25B 5/12* (2006.01)
*B25B 5/16* (2006.01)
*B23K 101/38* (2006.01)
*B23K 101/18* (2006.01)
*B23K 26/08* (2014.01)
*B23K 26/38* (2014.01)
*B23K 26/142* (2014.01)

(52) U.S. Cl.
CPC ............... *B23K 26/38* (2013.01); *B25B 5/12* (2013.01); *B25B 5/163* (2013.01); *H01R 43/16* (2013.01); *B23K 2101/18* (2018.08); *B23K 2101/38* (2018.08)

(58) Field of Classification Search
USPC ............ 219/121.44, 121.64, 121.67, 121.82, 219/121.84, 121.86
See application file for complete search history.

(56) References Cited

U.S. PATENT DOCUMENTS

| | | | | |
|---|---|---|---|---|
| 5,922,225 A | * | 7/1999 | Blake | ............... B23K 26/10 219/121.67 |
| 7,857,020 B2 | * | 12/2010 | McDaniel | ............... B27C 1/10 144/144.1 |
| 2006/0249228 A1 | * | 11/2006 | Hout | ............... B27F 1/12 144/144.1 |
| 2007/0102859 A1 | * | 5/2007 | Hagan | ............... B25B 5/12 269/228 |
| 2008/0121310 A1 | * | 5/2008 | Grisley | ............... B23O 9/0042 144/144.51 |
| 2008/0192104 A1 | * | 8/2008 | Nye | ............... B41J 3/4073 347/110 |

FOREIGN PATENT DOCUMENTS

| | | |
|---|---|---|
| NL | 1021622 C2 | 4/2004 |
| WO | 03051571 A1 | 6/2003 |

OTHER PUBLICATIONS

PCT Notification, International Search Report and Written Opinion, dated Apr. 28, 2016, 12 pages.
Abstract of NL1021622, dated Apr. 14, 2004, 1 page.
Abstract of DE3816692, dated Nov. 30, 1989, 1 page.

* cited by examiner

CUTTING SYSTEM

CROSS-REFERENCE TO RELATED APPLICATION

This application is a continuation of PCT International Patent Application No. PCT/IB/32015/059732, filed on Dec. 17, 2015, which claims priority under 35 U.S.C. § 119 to Chinese Patent Application No. CN 201410791172.5, filed on Dec. 18, 2014.

FIELD OF THE INVENTION

The present invention relates to a cutting system, more particularly, to a cutting system for cutting a plurality of workpieces.

BACKGROUND

In electronics manufacturing, a plurality of workpieces, for example, contacts, are often machined from a metal plate. The workpieces are machined by punching or cutting the metal plate with a known punching or cutting tool. However, known methods using the conventional punching or cutting tool have a slow processing speed and low production efficiency. Furthermore, the workpieces machined by the conventional punching or cutting tool have rough edges, reducing the quality of the workpiece.

SUMMARY

An object of the invention, among others, is to provide a cutting system capable of cutting a plurality of workpieces in a single cutting process while improving the cut quality of edges of the workpieces. The disclosed cutting system comprises a moving mechanism, a cutter mounted on the moving mechanism, a support table having a material plate disposed thereon, and a fixation device including a pressing plate having a row of teeth defining a row of teeth slots. The row of teeth press the material plate on the support table while the moving mechanism drives the cutter to move along edges of the row of teeth slots. The cutter cuts a plurality of workpieces out of the material plate by a single cutting process.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a cutting system. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
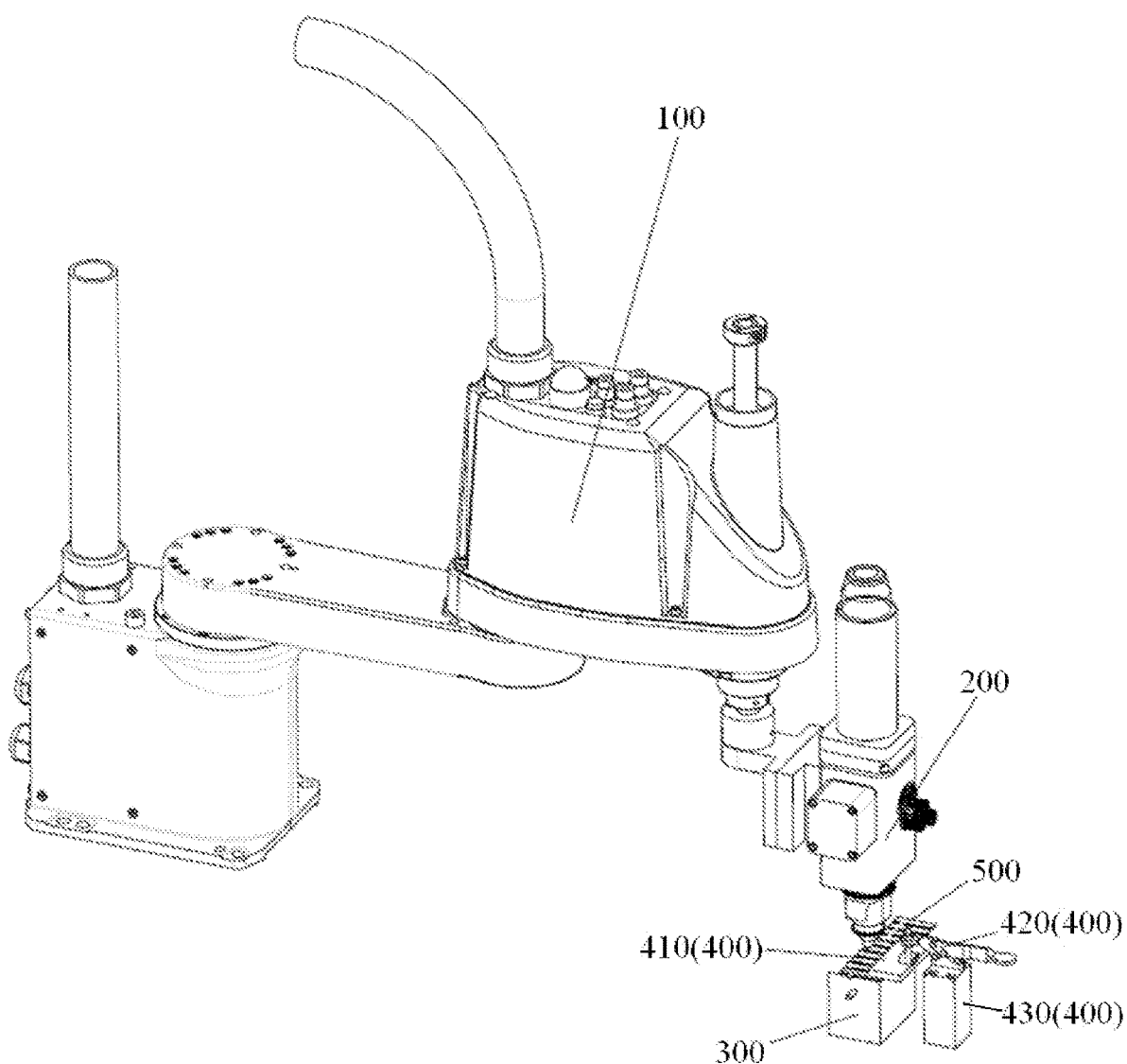
FIG. 1 is a perspective view of a cutting system according to the invention.

The cutting system is shown generally in FIG. 1 and includes a moving mechanism 100, a cutter 200, a support table 300, and a fixation device 400. The major components of the invention will now be described in greater detail.

The moving mechanism 100 is shown in FIG. 1. The moving mechanism 100 may comprise a multi-freedom robot, for example, a robot with four, five, or six degrees of freedom.

The cutter 200 is shown in FIG. 1. The cutter 200 may be a laser cutter.

Figure 2:
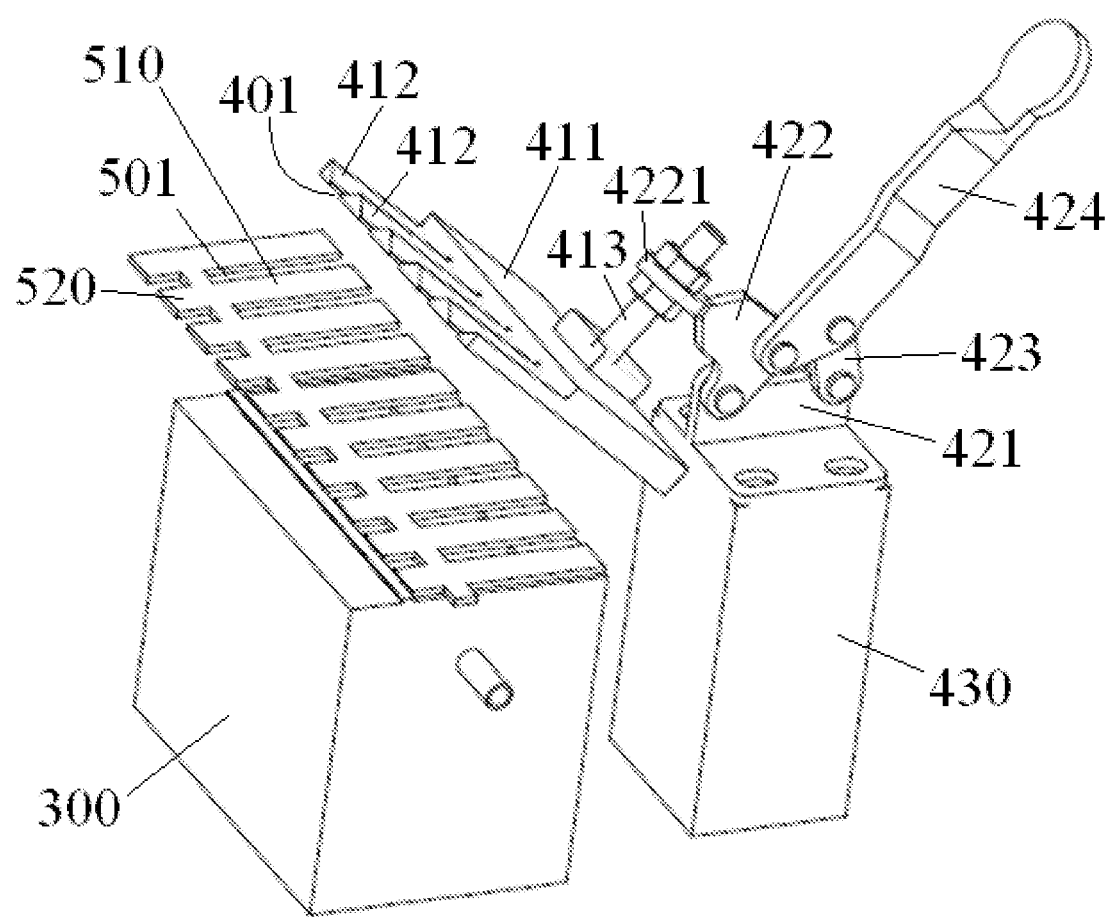
FIG. 2 is a perspective view of a support table and a fixation device of the cutting system of FIG. 1.
Figure 3:
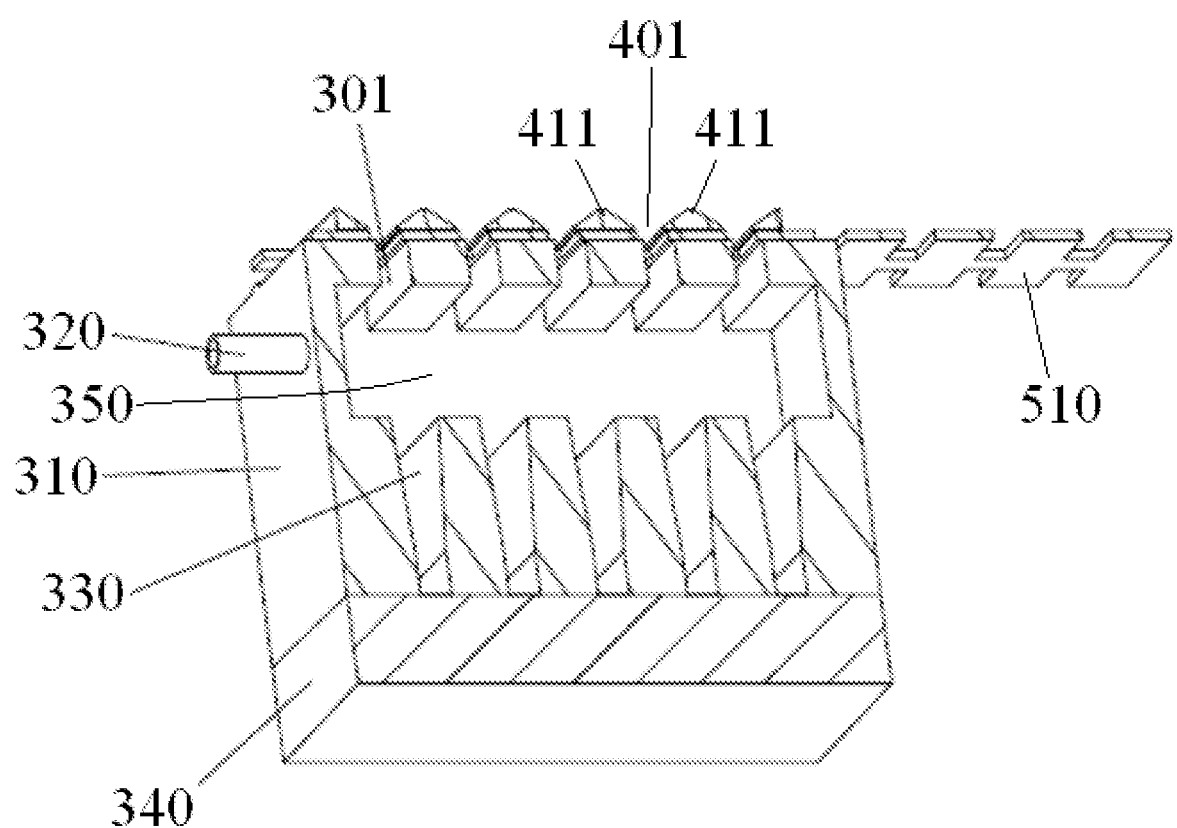
FIG. 3 is a sectional view of the support table and fixation device of FIG. 2.

The support table 300 is shown in FIGS. 1-3. As shown in FIG. 3, the support table 300 has a body 310, a vacuum suction pipe 320, material collecting slots 330, a bottom cover 340, and a chamber 350. The body 310, as shown in FIG. 3, has the chamber 350 formed therein. A row of the material dropping slots 301 is formed in a top wall of the chamber 350. A row of material collecting slots 330, corresponding to the row of material dropping slots 301, are formed in the bottom wall of the chamber 350. In the shown embodiment, the material collecting slot 330 have a trumpet shape with a larger opening facing the material dropping slots 301 and a smaller opening opposite to the larger opening. The cutting system further comprises a vacuum (not shown) with a vacuum suction pipe 320 extending into the chamber 350 from a side wall of the chamber 350. The bottom cover 340 is provided on the bottom of the body 310.

The fixation device 400 is shown in FIGS. 1-3. The fixation device 400 has a pressing plate 410, a force exerting mechanism 420, and a base 430.

The pressing plate 410, as shown in FIG. 2, has a plate body 411 with a connection rod 413 provided thereon, the connection rod 413 has a threaded end. The pressing plate 410 also has a row of teeth 412 defining a row of teeth slots 401.

The force exerting mechanism 420, as shown in FIG. 2, has a first linking plate 421, a second linking plate 422, a third linking plate 423, and a handle 424. The first linking plate 421 is fixed on the base 430 and has a first end and a second end. The second linking plate 422 has a first corner, a second corner and a third corner. The first corner of the second linking plate 422 is pivotally connected to the first end of the first linking plate 421. The third linking plate 423 has a first end and a second end, the first end of the third linking plate 423 is pivotally connected to the second end of the first linking plate 421. One bottom side of the handle 424 is pivotally connected to the second corner of the second linking plate 422, and the other bottom side of the handle 424 is pivotally connected to the second end of the third linking plate 423. In the shown embodiment, the force exerting mechanism 420 has pivotal joints. But the present invention is not limited to this, the force exerting mechanism 420 may comprise an air cylinder or a hydraulic cylinder, with a piston rod of the air cylinder or the hydraulic cylinder exerting a pressing force.

A connection member 4221 is provided on the third corner of the second linking plate 422 and formed with a through hole. The threaded end of the connection rod 413 passes through the through hole of the connection member 4221 and is locked on the connection member 4221 by two fasteners, for example, nuts, at both sides of the connection member 4221. The pressing plate 410 is thus fixedly connected to the third corner of the second linking plate 422.

The assembly of the cutting system will now be described in greater detail with reference to FIG. 1. The laser cutter 200 is mounted on an end arm of the moving mechanism 100 and located above the top surface of the support table 300. The fixation device 400 is positioned to be pivotable over the support plate 300.

The use of the cutting system will now be described in greater detail with reference to FIGS. 1-3.

The cutting system is used with a material plate 500 as shown in FIGS. 1-3. The material plate 500 may be a metal plate. The material plate 500, as shown in FIG. 2, has workpieces 510, which may be metal contacts. The material plate 500 also has an edge 520 for locating and conveying the material plate 500. For facilitating the transmission of the workpieces 510, the workpieces 510 initially are connected to each other by the edge 520.

The material plate 500 is positioned on the support table 300, as shown in FIG. 1. The force exerting mechanism 420 exerts a pressing force on the pressing plate 410, by rotating the handle 424, so as to press the material plate 500 positioned on the support table 300 with the pressing plate 410. The force exerting mechanism 420 is configured to be switched between a locking state, shown in FIG. 1, where the material plate 500 is pressed, and an unlocking state, shown in FIG. 2, where the material plate 500 is released. When the force exerting mechanism 420 is switched to the locking state, the second linking plate 422 and the third linking plate 423 of the force exerting mechanism 420 are engaged to each other by friction, so as to keep the force exerting mechanism 420 in the locking state. Furthermore, when the force exerting mechanism 420 is switched to the locking state, the handle 424 is rotated to a horizontal position substantially parallel to the pressing plate 410.

The moving mechanism 100 drives a head of the cutter 200 to move along a predetermined trajectory based on a preset control program. During cutting of the material plate 500, the cutter 200 emits a laser beam, and as the row of teeth 412 press the sheet of material plate 500 on the support table 300, the moving mechanism 100 drives the laser head of the cutter 200 to move along edges of the teeth slots 401, so as to cut and form a row of workpieces 510. The workpieces 510 corresponding to the row of teeth 412 are cut out of the material plate 500 by a single cutting process. The edge 520 of the sheet of material plate 500 is cut off last, so as to separate the work pieces 510 from each other for use.

In the shown embodiment, the teeth 412 are identical with each other in size and shape, so that the row of workpieces 510 are identical with each other in size and shape. The present invention, however, is not limited to this, the row teeth 412 may be different from each other in size and shape, so that the row of workpieces 510 made from the material plate 500 are different from each other in size and shape.

Through the row of material dropping slots 301 in the top wall of the chamber 350, waste material cut from the material plate 500 falls into the chamber 350, and smoke and dust produced during cutting the sheet of material plate 500 enters into the chamber 350. The vacuum suction pipe 320 sucks the smoke and dust out of the chamber 350. The waste material falling into the chamber 350 through the material dropping slots 301 is collected in the material collecting slots 330 and is discharged through the smaller openings of the material collecting slots 330 after the bottom cover 340 is opened.

Advantageously, in the cutting system according to the invention, the workpieces 510 are cut out of the material plate 500 by a single cutting process, increasing cutting efficiency. Furthermore, the laser cutter 200 cuts a smooth edge on the workpieces 510, improving the cut quality of the edges of the workpieces 510.

What is claimed is:

1. A cutting system, comprising:
   a moving mechanism;
   a cutter mounted on the moving mechanism;
   a support table having a material plate disposed thereon; and
   a fixation device including a pressing plate having a row of teeth defined therein and defining a row of teeth slots, the row of teeth pressing the material plate on the support table while the moving mechanism drives the cutter to move along edges of each of the teeth slots, the cutter cutting a plurality of workpieces corresponding in shape to the teeth out of the material plate by a single cutting process.

2. The cutting system of claim 1, wherein the cutter is a laser cutter.

3. The cutting system of claim 1, wherein the material plate is a metal plate.

4. The cutting system of claim 1, wherein each tooth in the row of teeth has an identical size and an identical shape, and each workpiece of the plurality of workpieces has an identical size and an identical shape.

5. The cutting system of claim 1, wherein each tooth in the row of teeth has a different size and a different shape, and each workpiece of the plurality of workpieces has a different size and a different shape.

6. The cutting system of claim 1, wherein the fixation device includes a force exerting mechanism exerting a pressing force on the pressing plate.

7. The cutting system of claim 6, wherein the force exerting mechanism is switched between a locking state wherein the material plate is pressed and an unlocking state wherein the material plate is released.

8. The cutting system of claim 7, wherein the pressing force is exerted on the pressing plate by rotating a handle of the force exerting mechanism.

9. The cutting system of claim 8, wherein, when the force exerting mechanism is in the locking state, the handle is rotated to and held at a horizontal position substantially parallel to the pressing plate.

10. The cutting system of claim 9, wherein the force exerting mechanism includes
    a first linking plate fixed on a base and having a first end and a second end;
    a second linking plate having a first corner, a second corner, and a third corner, the first corner pivotally connected to the first end of the first linking plate;
    a third linking plate having a first end and a second end, the first end of the third linking plate pivotally connected to the second end of the first linking plate; and
    the handle having a first bottom side pivotally connected to the second corner of the second linking plate and a second bottom side pivotally connected to the second end of the third linking plate.

11. The cutting system of claim 10, wherein the pressing plate is fixed to the third corner of the second linking plate.

12. The cutting system of claim 11, wherein the pressing plate has a plate body with a connection rod.

13. The cutting system of claim 12, wherein the second linking plate has a connection member disposed on the third corner of the second linking plate and including a through hole.

14. The cutting system of claim 13, wherein a threaded end of the connection rod extends through the through hole and is fixed to the connection member.

15. The cutting system of claim 10, wherein, when the force exerting mechanism is in the locking state, the second linking plate and the third linking plate are engaged by friction.

16. The cutting system of claim 6, wherein the force exerting mechanism has an air cylinder or a hydraulic cylinder, a piston rod of the air cylinder or the hydraulic cylinder exerting the pressing force.

17. The cutting system of claim 1, wherein the support table has a body with a chamber formed therein.

18. The cutting system of claim 17, wherein a row of material dropping slots corresponding to the row of teeth slots is formed in a top wall of the chamber.

19. The cutting system of claim 18, wherein waste material cut from the material plate falls into the chamber through the row of material dropping slots, and smoke and dust produced during the cutting enters into the chamber.

20. The cutting system of claim 19, further comprising a vacuum suction pipe extending into the chamber from a side wall of the chamber.

21. The cutting system of claim 20, wherein a row of material collecting slots corresponding to the row of material dropping slots is formed in a bottom wall of the chamber, the waste material collected in the row of material collecting slots.

22. The cutting system of claim 21, wherein each material collecting slot in the row of material collecting slots has a larger opening facing the row of material dropping slots and a smaller opening opposite to the larger opening.

23. The cutting system of claim 22, wherein the support table has a bottom cover disposed on a bottom of the body.

24. The cutting system of claim 23, wherein the waste material collected in the row of material collecting slots is discharged through the smaller opening of each material collecting slot after the bottom cover is opened.

25. The cutting system of claim 1, wherein the moving mechanism is a multi-freedom robot and the cutter is mounted on an end arm of the multi-freedom robot.

* * * * *